July 23, 1935.　　　　H. W. BROOKE　　　　2,009,041
PORTABLE FOOD CONDITIONING OVEN
Filed Aug. 31, 1933　　　3 Sheets-Sheet 1
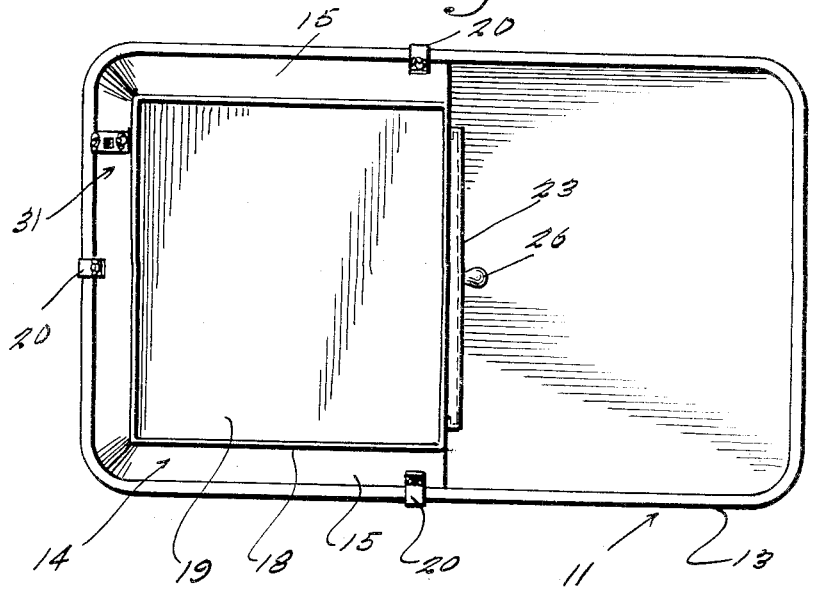
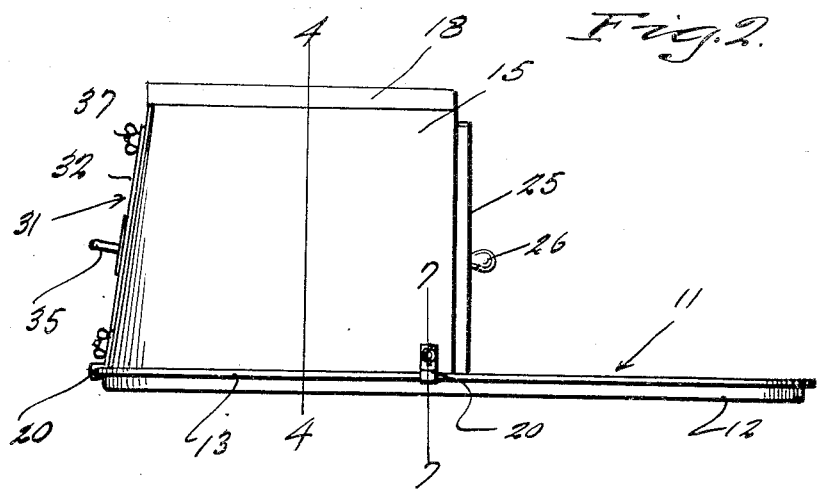
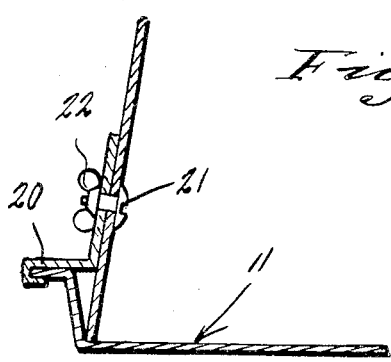
Inventor
Hazel W. Brooke
By Clarence A. O'Brien
Attorney July 23, 1935.  H. W. BROOKE  2,009,041
PORTABLE FOOD CONDITIONING OVEN
Filed Aug. 31, 1933  3 Sheets-Sheet 2
Fig. 3.
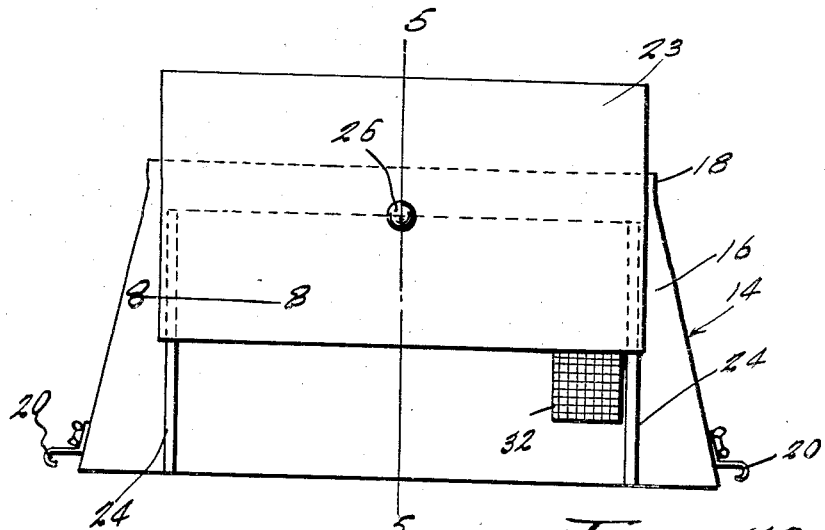
Fig. 10.
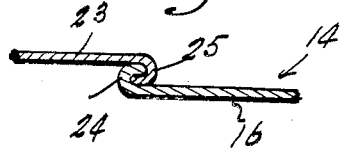
Fig. 8.
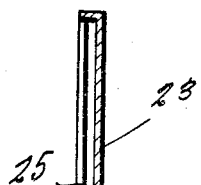
Fig. 9.
Inventor
Hazel W. Brooke
By Clarence A. O'Brien
Attorney

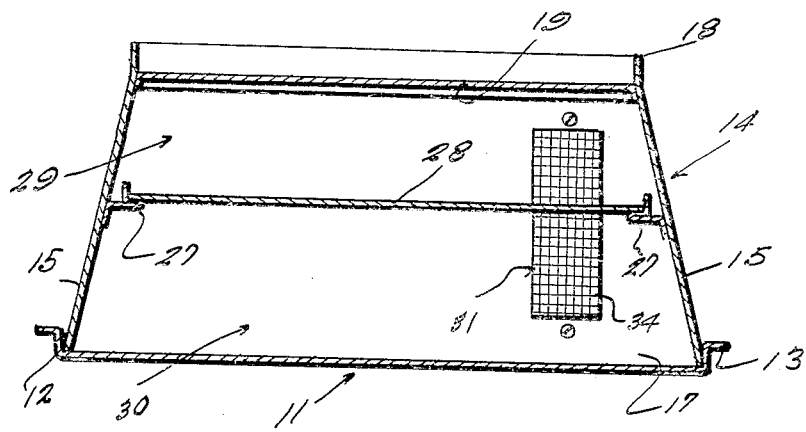
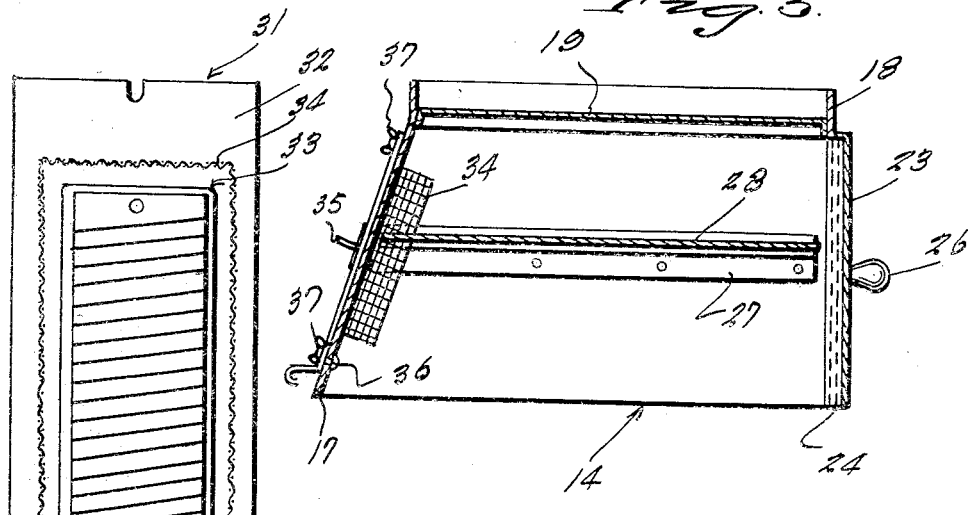
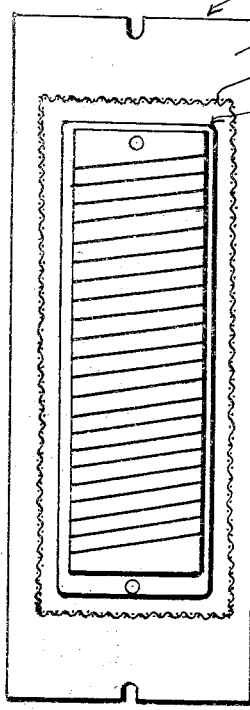

Patented July 23, 1935

2,009,041

UNITED STATES PATENT OFFICE 2,009,041

PORTABLE FOOD CONDITIONING OVEN

Hazel W. Brooke, Toronto, Ontario, Canada

Application August 31, 1933, Serial No. 687,688

3 Claims. (Cl. 219—35)

This invention relates to a portable food containing, serving, and conditioning device or structure which may be conveniently referred to as an oven.

Inspired by the need for a small capacity meal warming and conditioning oven for hospitals and sick-room use, I have evolved and produced a structural arrangement which because of its nature and ability to fulfill the special purposes for which it is intended, constitutes an innovation in this particular line of endeavor.

It is a matter of common knowledge that when the attendants follow the present-day system of feeding patients, the food is, as a general rule, openly transported on an appropriate service wagon or the like. Moreover, the various containers for the food are generally placed in a bed tray, shelf, or suitable accommodation device. Naturally the time consumed in arranging and transporting meals promotes delay during which time the articles of food supposed to be consumed hot or warm, cool off to such an extent as to be not only unpalatable, but not in accordance with the doctor's orders.

It follows, therefore, that I have discovered the need for a food conditioning and protective oven or enclosure which is especially, but not necessarily, designed as an attachment for a tray or the like, whereby to permit those portions of the meal desired to be served hot to be retained at the requisite temperature.

Exercising precautionary judgment in the perfection of the preferred embodiment of the invention, I have developed a structure which is aptly fitted for the purpose, one which is easy to handle by those using it, simple, economical and practical, and whose features of accommodation and adaptation transcend those of similar devices, if any, intended for a corresponding purpose.

The explicit details and their relative arrangement and mechanical association, and other properties which are destined to be endorsed by the profession, will become more readily apparent from the following description and drawings.

In the drawings:

Figure 1 is a top plan view of the preferred embodiment of the invention showing how it is associated with a transportable tray such as is generally used for food service in hospitals and the like.

Figure 2 is a side elevational view of the assembly shown in Figure 1.

Figure 3 is a front end elevation with the device detached from the tray.

Figure 4 is a section taken approximately on the plane of the line 4—4 of Figure 2.

Figure 5 is a section at right angles to Figure 4 taken on the plane of the line 5—5 of Figure 3.

Figure 6 is an enlarged detail view of the detachable electrical heating unit.

Figure 7 is an exaggerated sectional view taken approximately on the plane of the line 7—7 of Figure 2.

Figure 8 is a horizontal detail section on the line 8—8 of Figure 3.

Figure 9 is a section through the slidable closure or door.

Figure 10 is a top plan view of the perforated partitioning shelf.

In the drawings, the numeral 11 designates an ordinary rectangular service tray such as is used in the home, hospital, and similar places of accommodation. It is shown as provided with a marginal upstanding rim 12 having an outstanding lip or flange 13. In practice, the invention, generally represented by the numeral 14, is designed to be used in connection with just such a tray. Obviously, however, the invention may be made as an independent device or as an accessory to service equipment of various types now used in places of confinement.

The device 14 comprises essentially a casing or enclosure which is here illustrated as of general rectangular box-like design. It is shown as open at its bottom and is composed of appropriate light-weight sheet metal or equivalent material. For sake of convenience, the side walls are differentiated by the numerals 15, the front wall is indicated at 16, and the back wall at 17.

The upper portion of the casing is formed with an upstanding extension which may be described as a confining flange 18, the same being associated with the sunken or lowered trap 19 to provide a receptacle or pan for plates, knives and forks, or other accessories and utensils. In the form of the invention illustrated, the casing or box is so made as to permit it to be seated within the confines of the rim 12 of the main service tray 11. In order to maintain the device at one end of the tray and to leave the other end unobstructed for appropriate use, I provide hooked clips or clamps 20 which as shown in Figure 7 are designed to engage over the flange 13. Bolts and nuts 21 and 22 serve to retain the clamps removably in place.

At this time, I call attention to the fact that the front wall 16 is provided with a door opening and a suitable sliding door or panel 23 is provided for closing this. It will be observed that along the vertical edge portions of the door opening the metal of the front wall is rolled into channel-shaped guides 24 with which the correspondingly shaped guides 25 on the vertical edges of the door co-operate in sliding contact. A suitable degree of friction exists here so as to hold the door in a desired elevated or closed position. Incidentally, the door is provided with an actuating knob 26 as shown in Figure 9.

On the interior of the side walls 15 as shown in Figure 4, are horizontal ledges 27 designed and located to support a slidable apertured partitioning shelf 28. This shelf serves to divide the casing into upper and lower food containing compartments 29 and 30 respectively. The shelf 28 is removable when not needed. Moreover, it is provided with a multiplicity of holes as shown in Figure 10 to facilitate circulation of air to promote uniform heating results.

It will be noticed that the rear wall is provided with an opening to accommodate the heating unit 31. This unit, as shown in Figure 6, comprises an adapter or backing plate 32 carrying an electric heating element 33 of an appropriate construction contained in a protective cage 34. In use, an appropriate cord and plug is provided for the heating element to permit it to be conveniently brought into play the plug engaging the prongs 35. The plate 32 is provided with a handle 35 and is held in place by bolts 36 and thumbnuts 37. This permits the unit to be bodily placed in position and removed as conditions require.

In order that the following claims will not be needlessly limited in interpretation, I desire to point out that the device 14 may be made either as an attachment for the tray 11, or it may be made as a complete oven for individual use. Moreover, while the description implies that the invention is primarily adapted for use in hospitals and sick rooms, it is manifest that it can well be used in hotels, and other places wherein the service of hot meals is desired or required.

As will be ascertained from the following claims, the gist of the invention is found in the provision of a casing or enclosure of appropriate material, design, and proportion, which is preferably used as an attachment for a tray and held removably in place thereon by appropriate clips or clamps. The casing is provided with a suitable heating device preferably of an electrical type. A device constructed in accordance with the principles of the present invention is believed to adequately fulfill the requirements of such an arrangement.

Attention is directed to the fact that the so-called heating element is made detachable so that it can be bodily removed to permit the oven as a unit to be steamed cleaned or otherwise cleansed.

A careful consideration of the foregoing description in conjunction with the illustrative drawings will enable the reader to obtain a clear understanding of the purpose, features and advantages, the explicit construction, and the invention as hereinafter claimed.

It is to be understood that minor changes in shape, size, relative proportions and materials may be resorted to in practice without departing from the spirit of the invention or the scope of the invention as now claimed.

I claim:

1. In a structure of the class described, a box-like casing provided in its front wall with an entrance opening, said entrance opening being provided along vertical edge portions with outstanding channel-shaped guides, a slidable panel-like closure for said opening, the end portions thereof being formed with hooked retention members slidably engageable with said guide channels, said casing being provided on its interior with ledges, and a removable apertured partitioning shelf slidably supported on said ledges, the upper portion of said casing being constructed with a depressed top and an upstanding marginal flange co-operating with said top in defining an accessory receptacle, together with a bodily removable electrical heating unit attached to the rear wall of the casing.

2. In a structure of the class described, a tray provided with a marginal rim and an outstanding flange, an open bottom box-like casing, a removable shelf in said casing, a bodily removable electric unit carried by the rear wall of the casing and projecting into the interior thereof, and clamps carried by the walls of said casing and engageable with said flange to hold the casing in position on the tray.

3. In a structure of the class described, a tray provided with a marginal rim and outstanding flange, a casing having its bottom open and said casing being of considerably less length than the length of the tray, clamps carried by the lower portions of the walls of the casing and engageable with said flange for detachably connecting the lower part of the casing with the tray with the casing having its lower part seated in one end portion of the tray, the wall of the casing facing the unoccupied part of the tray having an opening therein for permitting articles to be taken from the casing and placed in that part of the tray not occupied by the casing, a door for closing said opening, and a temperature changing means in the casing.

HAZEL W. BROOKE.